(12) United States Patent
Singapurwala

(10) Patent No.: US 11,468,148 B2
(45) Date of Patent: Oct. 11, 2022

(54) METHOD AND SYSTEM FOR DATA SAMPLING USING ARTIFICIAL NEURAL NETWORK (ANN) MODEL

(71) Applicant: Wipro Limited, Bangalore (IN)

(72) Inventor: Abbas Singapurwala, Madhya Pradesh (IN)

(73) Assignee: Wipro Limited, Bangalore (IN)

( * ) Notice: Subject to any disclaimer, the term of this patent is extended or adjusted under 35 U.S.C. 154(b) by 680 days.

(21) Appl. No.: 16/540,208

(22) Filed: Aug. 14, 2019

(65) Prior Publication Data

US 2020/0410041 A1 Dec. 31, 2020

(30) Foreign Application Priority Data

Jun. 29, 2019 (IN) .............................. 201941026058

(51) Int. Cl.
*G06F 17/00* (2019.01)
*G06N 5/02* (2006.01)
(Continued)

(52) U.S. Cl.
CPC .............. *G06F 17/18* (2013.01); *G06N 3/04* (2013.01); *G06N 5/022* (2013.01); *G06N 3/0445* (2013.01);
(Continued)

(58) Field of Classification Search
CPC ........ G06F 17/18; G06N 3/04; G06N 3/0454; G06N 3/08; G06N 3/006; G06N 3/0445;
(Continued)

(56) References Cited

U.S. PATENT DOCUMENTS 6,493,637 B1 12/2002 Steeg
7,711,662 B2 5/2010 Buscema
(Continued)

FOREIGN PATENT DOCUMENTS

WO 2016061628 A1 4/2016

OTHER PUBLICATIONS

Jinjun Tang et al., An Improved Fuzzy Neural Network for Traffic Speed Prediction Considering Periodic Characteristic, 2017 IEEE, [Retrieved on Jun. 6, 2022]. Retrieved from the internet: <URL: https://ieeexplore.ieee.org/stamp/stamp.jsp?tp=&arnumber=7817841> 11 Pages (2340-2350) (Year: 2017).*

*Primary Examiner* — Anibal Rivera
(74) *Attorney, Agent, or Firm* — Finnegan, Henderson, Farabow, Garrett & Dunner, LLP

(57) ABSTRACT

This disclosure relates to method and system for data sampling using an artificial neural network (ANN) model. In an embodiment, the method includes identifying a plurality of numerical data columns and a plurality of categorical data columns in population dataset, determining a set of predictor variables and a set of predictand variables by applying a linear regression on the plurality of numerical data columns, generating a sequential prediction model based on the set of predictor variables and the set of predictand variables, and performing stratified sampling on the plurality of categorical data columns to generate a set of stratified samples. The method further includes generating a sample key based on the set of stratified samples and the sequential prediction model, and generating a sample dataset representative of the population dataset based on the sample key.

20 Claims, 8 Drawing Sheets

(51) Int. Cl.
  *G06F 17/18*   (2006.01)
  *G06N 3/04*    (2006.01)
  G06N 3/08     (2006.01)
  G06N 3/12     (2006.01)
  G06N 5/04     (2006.01)

(52) U.S. Cl.
  CPC ......... *G06N 3/0454* (2013.01); *G06N 3/0472* (2013.01); *G06N 3/08* (2013.01); *G06N 3/126* (2013.01); *G06N 5/025* (2013.01); *G06N 5/046* (2013.01)

(58) Field of Classification Search
  CPC ........ G06N 3/02; G06N 3/0472; G06N 3/088; G06N 3/126; G06N 3/105; G06N 5/022; G06N 5/046; G06N 5/04; G06N 5/003; G06N 5/025
  See application file for complete search history.

(56) References Cited

U.S. PATENT DOCUMENTS

| | | | |
|---|---|---|---|
| 8,214,314 B2 * | 7/2012 | Bonissone | G06Q 40/08 706/46 |
| 2002/0016731 A1 | 2/2002 | Kupersmit | |
| 2019/0050465 A1 * | 2/2019 | Khalil | G06F 16/258 |

* cited by examiner

METHOD AND SYSTEM FOR DATA SAMPLING USING ARTIFICIAL NEURAL NETWORK (ANN) MODEL

TECHNICAL FIELD

This disclosure relates generally to data sampling, and more particularly to a method and a system for data sampling using an artificial neural network (ANN) model.

BACKGROUND

Data sampling is a technique to select a statistically representative data subset (i.e., sample dataset) from a population dataset and is applied across a wide array of industries and application areas. Typically, sampling may be performed so as to identify certain characteristics of the population dataset using the sample dataset. In particular, the result of such study (i.e., identified characteristics for the sample dataset) may be generalized over the entire population dataset. Thus, in the area of statistical research, sampling is a fundamental approach to generalize findings on the population because it may not possible to analyze entire population dataset or to gather data for entire population. Moreover, sampling may be cost effective and time efficient because less resources may be required to analyze a smaller sample dataset as compared to the population dataset.

As will be appreciated, accuracy of statistically relevant samples may be crucial to perform any type of data modeling or to perform predictive analytics. For example, if the selected samples in the sample dataset are not representative of the population, any references drawn on the sample dataset or conclusions derived from analytics on such sample dataset may automatically suffer from a selection bias. Accordingly, improvement of sample quality is of crucial importance in data sampling and modelling.

Although, a sample may be expected to behave exactly as a mirror image of the population, it may be challenging to ensure the same. Typically, sampling error limits selection of an accurate representative sample during the data sampling process. Sampling error may creep in when there are differences between the sample and the population on the basis of units selected during the sampling process due to various reasons including, but not limited to, sampling bias. Sampling bias means favoring one type of unit with particular characteristics while making a sample over and above other type of unit with different type of characteristics. Even if a sample is chosen by selecting units from the population on a random basis, there is no guarantee that sampling bias can be avoided fully. For example, if the population itself has a high ratio of a particular type of unit compared to the other type, then the sample created by random selection approach may be more susceptible to sampling bias problem. Since, in random sampling technique, there is an equal probability of a unit getting selected, sampling error may be difficult to avoid.

In some cases, stratified sampling technique may be employed in place of random sampling technique. In conventional stratified sampling technique, units are first selected based on their category or characteristics called stratum. The units may then be selected on the basis of randomly selecting the units from these strata based on the proportion of these strata in the population. Although, the conventional stratified sampling technique may solve the issue of sampling bias to a great extent, it is still limited in providing a completely representative sample of the population as the unit is selected randomly on the basis of one particular category. Thus, if there are multiple categories present in the population, the conventional stratified sampling technique has failed to prove effective. Additionally, selecting a unit randomly may not guarantee a similar distribution of numeric type attributes in the population and sample data.

In some conventional method, sampling may be based on detecting coincidences in a dataset of objects where each object may be described by a set of attribute values. Additionally, in some other conventional sampling method, a genetic algorithm may be applied to the population to generate a data sample from the population with the help of a neural network based prediction algorithm. However, the conventional methods are limited in their scope and utility in generating an accurate representative sample of the population without any sampling bias.

SUMMARY

In one embodiment, a method for sampling population dataset using an artificial neural network (ANN) model is disclosed. In one example, the method may include identifying a plurality of numerical data columns and a plurality of categorical data columns in the population dataset. The method may further include determining a set of predictor variables and a set of predictand variables by applying a linear regression on the plurality of numerical data columns. The method may further include generating a sequential prediction model based on the set of predictor variables and the set of predictand variables. The method may further include performing stratified sampling on the plurality of categorical data columns to generate a set of stratified samples. The method may further include generating a sample key based on the set of stratified samples and the sequential prediction model. The method may further include generating a sample dataset representative of the population dataset based on the sample key.

In one embodiment, a system for sampling population dataset using the ANN model is disclosed. In one example, the system may include a data sampling device, which may include at least one processor and a memory communicatively coupled to the at least one processor. The memory may store processor-executable instructions, which, on execution, may cause the processor to identify a plurality of numerical data columns and a plurality of categorical data columns in the population dataset. The processor-executable instructions, on execution, may further cause the processor to determine a set of predictor variables and a set of predictand variables by applying a linear regression on the plurality of numerical data columns. The processor-executable instructions, on execution, may further cause the processor to generate a sequential prediction model based on the set of predictor variables and the set of predictand variables. The processor-executable instructions, on execution, may further cause the processor to perform stratified sampling on the plurality of categorical data columns to generate a set of stratified samples. The processor-executable instructions, on execution, may further cause the processor to generate a sample key based on the set of stratified samples and the sequential prediction model. The processor-executable instructions, on execution, may further cause the processor to generate a sample dataset representative of the population dataset based on the sample key.

In one embodiment, a non-transitory computer-readable medium storing computer-executable instructions for sampling population dataset using the ANN model is disclosed. In one example, the stored instructions, when executed by a processor, may cause the processor to perform operations including identifying a plurality of numerical data columns and a plurality of categorical data columns in the population dataset. The operations may further include determining a set of predictor variables and a set of predictand variables by applying a linear regression on the plurality of numerical data columns. The operation may further include generating a sequential prediction model based on the set of predictor variables and the set of predictand variables. The operations may further include performing stratified sampling on the plurality of categorical data columns to generate a set of stratified samples. The operation may further include generating a sample key based on the set of stratified samples and the sequential prediction model. The operation may further include generating a sample dataset representative of the population dataset based on the sample key.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
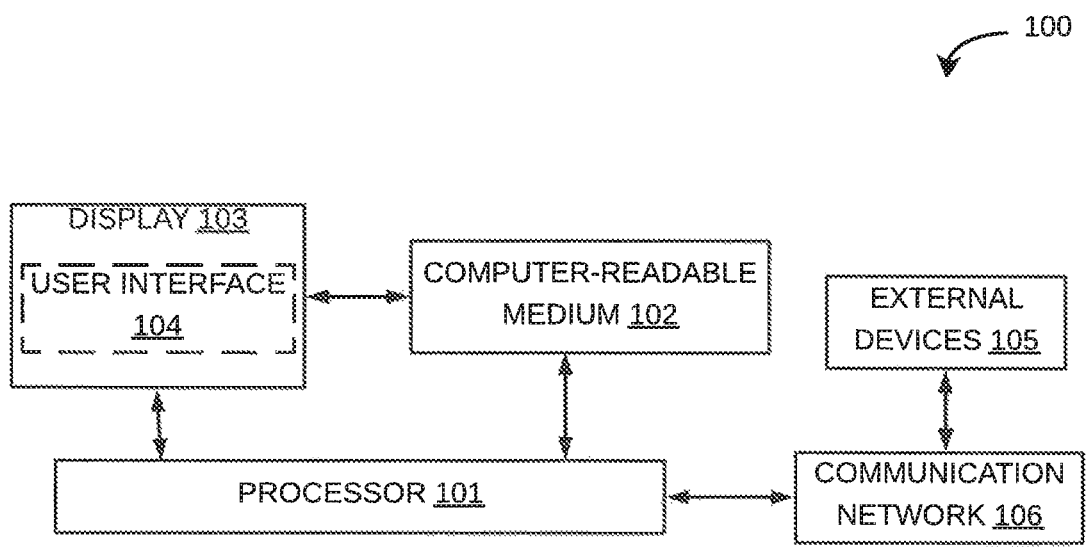
FIG. 1 is a block diagram of an exemplary system for sampling population dataset using an artificial neural network (ANN) model, in accordance with some embodiments of the present disclosure.

Referring now to FIG. 1, a block diagram of an exemplary system 100 for sampling population dataset using an artificial neural network (ANN) model is illustrated, in accordance with some embodiments of the present disclosure. The system 100 may implement in a data sampling device, in accordance with some embodiments of the present disclosure. In particular, the system 100 may include any computing device (for example, server, desktop, laptop, notebook, netbook, tablet, smartphone, mobile phone, or the like) that may implement the data sampling device.

As will be described in greater detail in conjunction with FIGS. 2-6, the data sampling device may identify a plurality of numerical data columns and a plurality of categorical data columns in the population dataset. Further, the data sampling device may determine a set of predictor variables and a set of predictand variables by applying a linear regression on the plurality of numerical data columns. Further, the data sampling device may generate a sequential prediction model based on the set of predictor variables and the set of predictand variables. Further, the data sampling device may perform stratified sampling on the plurality of categorical data columns to generate a set of stratified samples. Further, the data sampling device may generate a sample key based on the set of stratified samples and the sequential prediction model. Further, the data sampling device may generate a sample dataset representative of the population dataset based on the sample key.

The system 100 may include one or more processors 101, a computer-readable medium (for example, a memory) 102, and a display 103. The computer-readable storage medium 102 may store instructions that, when executed by the one or more processors 101, cause the one or more processors 101 to sample population dataset, in accordance with aspects of the present disclosure. The computer-readable storage medium 102 may also store various data (for example, a plurality of numerical data columns, a plurality of categorical data columns, a set of predictor variables, a set of predictand variables, a sequential prediction model, a set of stratified samples, a sample key, a sample dataset, a predetermined threshold, a sample size, a population size, a mean absolute error, and the like) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but may not be limited to, a remote server, a digital device, or another computing system.

Figure 2:
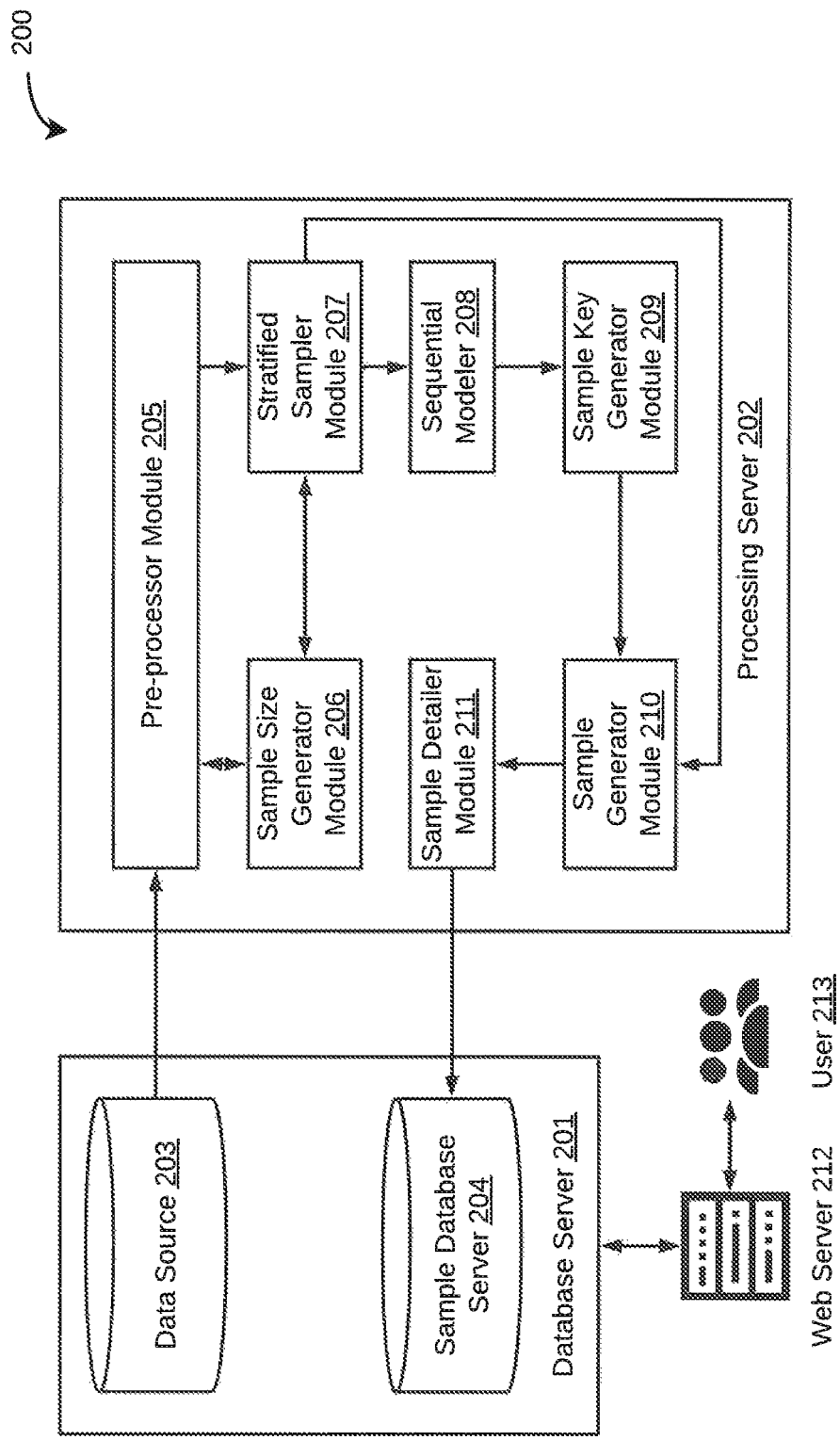
FIG. 2 is a functional block diagram of a data sampling device implemented by the exemplary system of FIG. 1, in accordance with some embodiments of the present disclosure.

Referring now to FIG. 2, a functional block diagram of a data sampling device 200 implemented by the system 100 is illustrated, in accordance with some embodiments of the present disclosure. The data sampling device 200 may include a database server 201 and a processing server 202. The database server 201 may further include a data source 203 and a sample database server 204. Moreover, the processing server may further include a pre-processor module 205, a sample size generator module 206, a stratified sampler module 207, a sequential modeler 208, a sample key generator module 209, a sample generator module 210, and a sampler detailer module 211. Additionally, the data sampling device 200 may include a web server 212 which may provide a sampled population dataset to a user 213. As will be appreciated by those skilled in the art, all such aforementioned modules 205-211 may be included in a processing server 202 and may be represented as a single module or a combination of different modules. Moreover, as will be appreciated by those skilled in the art, each of the modules 205-211 may reside, in whole or in parts, on one device or multiple devices in communication with each other.

The database server 201 may include a data source 203, which may have premise data store, cloud based storage facility, distributed file system, flat files, or the like. The data source 203 may be configured to fed a population dataset to the pre-processor module 205 in structured format (i.e., in tabular form with a plurality of rows and a plurality of columns) to initiate a sample dataset generation process. As will be appreciated, the user 213 may also generate the sample dataset based on the population dataset connected to the pre-processor module 205. It should be noted that the population dataset may include nature of irregularities ranging from incomplete values to inconsistent data values. Additionally, the population dataset may include a plurality of columns with different types of data values for generating the sample dataset. However, the population dataset may include at least one categorical column for stratified sampling of the population dataset.

The pre-processor module 205 may be configured to receive the population dataset from the data source 203. Further, based on the population dataset, the pre-processor module 205 may identify a plurality of parameters by processing the population dataset in a random access memory (RAM). The plurality of parameters may include:
  a. Numerical data columns: In the population dataset, the pre-processor module 205 may identify columns which may include at least one of an integer or a fraction (i.e., float) using "to_numeric( )" utility of a Pandas DataFrame. Pandas DataFrame is a two-dimensional size-mutable, potentially heterogeneous tabular data structure with labeled axes (rows and columns). A Data frame is a two-dimensional data structure, i.e., data is aligned in a tabular fashion in rows and columns. Further, the pre-processor module 205 may prepare a list of numerical data columns.
  b. Categorical data columns of numeric type: In the population dataset, the pre-processor module 205 may identify numeric data columns which may be categorical in nature by determining distinct count of numeric values with respect to population size. It should be noted that the pre-processor module 205 may identify a categorical data column of numeric type when the distinct count of numeric values in the column may be less than then 20% of the population size.
  c. Categorical data columns of string type: In the population dataset, the pre-processor module 205 may identify the plurality of categorical data columns of string type by taking a difference of the number of the plurality of categorical data columns and the number of the plurality of categorical data columns of numeric type.
  d. Predictor variables: The pre-processor module 205 may identify a set of predictor variables based on the list of the plurality of numerical data columns. In an embodiment, a predictor variable is a variable used in regression to predict another variable (i.e., predicatant variable). As will be described in greater detail in conjunction with FIG. 6, the pre-processor module 205 may use linregress( ) utility of stats package in python to generate a R-square value of range −1 to +1. It should be noted that the R-square value may signify a proportion of change in one variable when explained by remaining variable in a given column of the list of the plurality of numerical data columns. When the R-square value in the given column may be higher than 0.5 then the pre-processor module 205 may add the given column in the set of predictor variables.
  e. Predictand variables: The pre-processor module 205 may identify the set of predictand variables from the list of the plurality of numerical data columns in which one variable may have a signification effect on the remaining variables. As discussed above, a predictand variable is a variable that may be predicted based on one or more predictor variables using regression.

Moreover, the pre-processor module 205 may identify different categories of column based on data domains and distinct values of the data domains. The data domains may include numeric or string, and the distinct values of the data domains may include categorical or continuous data domains. Hence, the pre-processor module 205 may help in automatic identification of different types of columns in the population dataset on which the sampling methodology is based. Additionally, in the sampling methodology, the pre-processor module 205 may also overlook other processing tasks which may include:
  a. Filtering the plurality of categorical data columns on which a stratified sampling may be performed: The pre-processor module 205 may use the list of the plurality of numerical data columns and the list of the plurality of categorical data columns. In order to generate the sample dataset based on stratified shuffle split technique of sklearn python library, the plurality of numerical data columns and the plurality of categorical data columns may be generated in a pair of n number of categorical variables. When the number of categories may exceed half of the sample size calculated at 0.05 as a margin error, then the plurality of numerical data columns and the plurality of categorical data columns may be generated with n−1 number of categorical variables until the condition may be satisfied. The sample size at 5% margin error may be obtained from the sample size generator module 206. Hence, a list of the categorical variables may be identified, whose combination may be used to split remaining columns in the population dataset in exactly the proportion in which these categories are present.
  b. Filtering the plurality of numerical data columns and the combined list of the set of predictor variables and the set of predictand variables: The pre-processor module 205 may remove the plurality of numerical data columns which may be highly correlated with the remaining of the plurality of numerical data columns in the population dataset as highly correlated columns may behave exactly the same. The correlation of the plurality of numerical data columns may be identified based on a correlation coefficient which may be determined by one_way_chi_square, which may be a utility written from scratch to give pairs of correlated columns. It should be noted that the pair of the plurality of numerical data columns may be identified as highly correlative when the correlation coefficient may be higher than 0.8.
  c. Population Size: The pre-processor module 205 may calculate the population size based on the number of rows in the population dataset. The population size may be used further to determine a sample size.

The stratified sampler module 207 may be configured to receive the plurality of parameters from the pre-processor module 205. Based on the plurality of parameters, the stratified sampler module 207 may divide the population dataset into a segment X and a segment Y. The segment Y may include the plurality of categorical data columns received from the pre-processor module 205 on which the population dataset may be shuffled and split using the stratified sampling approach. Moreover, to ensure all the missing values may be accounted while carrying out the sampling, the stratified sampler module 207 may auto-fill the missing column cells with a default encoded value. It should be noted that, for the missing column cell of numeric category, the stratified sampler module 207 may use fit_transform( ) utility of sklearn module available in python language to auto-fill the missing column cell with the default encoded value. Additionally, for the missing column cell of string category, the stratified sampler module 207 may replace the missing column cell with the default encoded value using a isna( ) utility of python language. In general, the isna( ) utility of python language may be used to detect the empty cell values and subsequently filling the empty cell values with the default encoded value.

The segment X may include the plurality of numerical data columns which may be sampled based on the columns present in Y segment. When the plurality of numerical data columns in the population dataset may be absent then, for performing stratified sampling, a dummy column may be created by a program code. It should be noted that the dummy column may include rows exactly equal to the number of rows in the population dataset, and may be filled with a dummy value (for example—123456789).

However, when the plurality of numerical data columns may be present in the population dataset then the dummy column may not be required to create.

Further, the stratified sampler module 207 may be configured to receive a set of parameters from the sample size generator module 206 to generate a set of stratified samples. The set of parameters may include the population size (which may be calculated by the pre-processor module 205), a margin error, and a confidence level. It should be noted that the value of the margin error may be assigned 0.05 and the value of the confidence level may be assigned 0.99 by default. Further, to generate the set of stratified samples, a utility named Stratified Shuffle Split( ) of sklearn model_selection may be used with a number of splits and a test size.

The number of splits may be a number of the set of stratified sample which may be generated based on X sample and Y sample. It should be noted that the set of stratified samples may be a list of row indexes of the sample dataset. The number of splits may be 1, when the set of predictor variables and the set of predictand variables may not be identified by the pre-processor module 205. However, the number of splits may be 50 when some of the set of predictor variables and the set of predictand variables may be identified by the pre-processor module 205. The test size may be a ratio of the sample size to the population size. The sample size generator module may determine the sample size for the initial value of the margin error 0.05 and the confidence label 0.99.

When the sample size may be lower than the number of the set of stratified sample then the stratified sampler module 207 may generate a value error which may be handled by at least one of incrementing the sample size by a fixed numeric value (for example—100 unit) until the exception may be successfully handled, reducing the confidence label until the exception may be successfully handled, or increasing the margin of error until the exception may be successfully handled. Further, when the set of stratified sample may be generated successfully then the stratified sampler module 207 may send the sample size and the list of sample row indexes (when the number of splits may be 1) or the dictionary of n number of lists (when the number of splits may be more than 1), to the sequential modeler 208 and the sample generator module 210.

The stratified sampler module 207 may use the sample size generator module 210 to generate the set of stratified samples based on the utility named Stratified Shuffle Split( ) of sklearn.model_selection. The sample size generator module 210 may determine the sample size based on the population size, the margin of error, the confidence label, and a sigma value. It should be noted that the population size may be generated by the pre-processing module 205, the margin of error and the confidence label may be provided by the stratified sampler module 207, while the sigma value may be a constant (for example, a default value of 0.5 may be taken in some embodiments). Hence, the sample size generator module 210 may determine the sample size as:

$$\text{Sample Size} = \frac{z^2 * \sigma^2 * (N/(N-1))}{M^2 + z^2 * \sigma^2 * (N/(N-1))}$$

where, z may be calculated based on the alpha value mapped from the dictionary with confidence level as a key; a may be the Sigma Value; N may be the population size; and M may be the margin of error.

The sequential modeler 208 may be configured to generate a sequential prediction model to determine the set of predictand column values based on the set of predictor column values. The sequential modeler 208 may be a four layer dense neural network which may include an input layer, a hidden layer 1, a hidden layer 2, and an output layer. The input layer may receive the set of predictor variables as input for training the neural network. The hidden layer 1 may be connected to the input layer and the hidden layer 2 which may be further connected to the output layer. The output layer may generate the set of predictand variables. It should be noted that the sequential prediction model may be created using a python library keras.

The sample key generator module 209 may be configured to receive a set of n number of samples from the stratified sampler module 207. The set of n number of samples may be in form of a dictionary which may include the list of sample row indexes. Moreover, the sample key generator module 209 may also receive the sequential prediction model generated by the sequential modeler 208 to generate the sample key. Further, the sample key generator module 209 may follow a number of steps to identify an appropriate sample key out of the set of n number of samples. The steps are:

a. Iteration of samples: The sample key generator module 209 may iterate through the dictionary to evaluate each sample of the set of n number of samples. Further, the sample key generator module 209 may store a key of each sample in a temporary variable which may be the sample key. The value for the key in the dictionary may be the list of indexes. Further, a data frame for the sample may be generated based on the list of indexes and the population dataset.

b. Model Evaluation: The sample may split into two subsets of predictor and predictand columns as estimated in the pre-processor module 205 using the list of indexes obtained from the dictionary of sample indexes. The sequential prediction model may be trained in the sequential modeler 208 which may receive the predictand column values as input from the set of stratified samples to predict the values for the predictand columns. Further, the predicted value for the predictand columns may be compared against the actual values of the predictand columns from the set of stratified samples to obtain a mean absolute error parameter. Hence, the sample may be selected as an appropriate sample whose mean absolute error may be minimum.

c. Sample key Generation: The key of the appropriate sample which yields the least mean absolute error may be stored in the temporary variable which may be the key of the appropriate sample.

The sample generator module 210 may generate the sample selected by the sample key generator module 209 based on the sample key. Further, the list of indexes may be mapped to each of the columns of the population dataset to generate the sample even when there may be several types of irregularities already present. Further, the sample generator module 210 may store the sample in the data frame and passed to the sample detailer module 211 for extracting more information about the sample.

Further, the sample detailer module 211 may be configured to receive the sample data from the sample generator module 210, Based on the received sample data, the sample detailer module 211 may extract the plurality of information pertaining to the sample data. The plurality of information may include, but may not be limited to, sample data (as received from the sample generator module); mean absolute error (when the predictor and predictand columns exist); mean absolute error plot (the plot with sample key plotted on x-axis and mean absolute error plotted on y-axis): records in population (number of records in the population data calculated by the len( ) utility of python language); records of samples (number of records in the sample dataset calculated by the len( ) utility of python language); percentage records in the sample dataset (calculated as (records in sample/ records in population)* 100); population size in bytes (estimated using the getsize( ) utility of OS package in python language); size of sample in bytes (estimated by multiplying the population size in bytes by the percentage records in the sample dataset); number of categorical column and number of numeric column (each obtained from the pre-processor module 205); average record size (estimated based on ratio of the size of population dataset in bytes to the number of rows in population dataset); and a correlation plot (obtained using the Pearson method of correlation in the corr( ) utility of python language and matplotlib package, typically numeric columns are considered for generating the correlation plot).

Further, the sample generated by the sample generator module 210 and corresponding sample details generated by the Sample Detailer module 211 may be stored in the sample database server 204. Further, the sample and corresponding sample details may be exported to the user 213 in different formats which may include .csv, .json, pdf, or the like. Additionally, the sample and corresponding sample details may be stored in this server, which may be fetched by the web server for quick access and modifications when needed.

Further, the sample and corresponding sample details may be hosted in-premise or on cloud server for enabling user access. The data is rendered on the front end or web page enabled by the Flask functionality in python which helps in connecting our back end python scripts to the front end html pages. The interactive dashboard displays all the information about the sample generated and insights on data elements such as correlation results or regression results depicting different types of relationships between different types of columns in a dataset.

Figure 3:
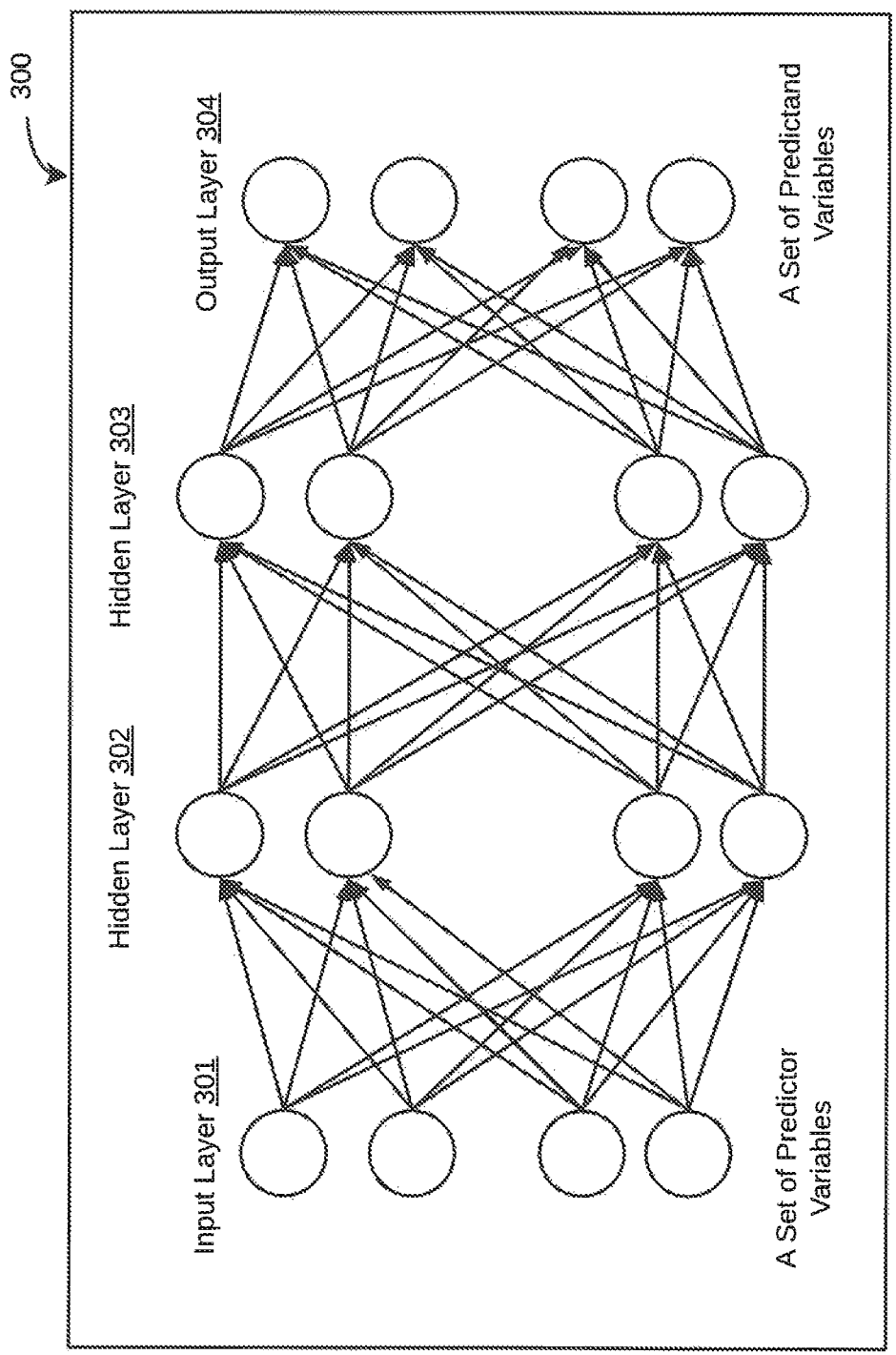
FIG. 3 is an architecture of a sequential prediction model, in accordance with some embodiments of the present disclosure.

Referring now to FIG. 3, an architecture of a sequential prediction model 300 is depicted, in accordance with some embodiments of the present disclosure. The sequential prediction model 300 may be a four layer dense neural network model. The four layers may include an input layer 301, a hidden layer 302, a hidden layer 303, and an output layer 304. The input layer may receive the set of predictor variables as input for training the neural network model and the output layer may generate a set of predictand variables.

Figure 4:
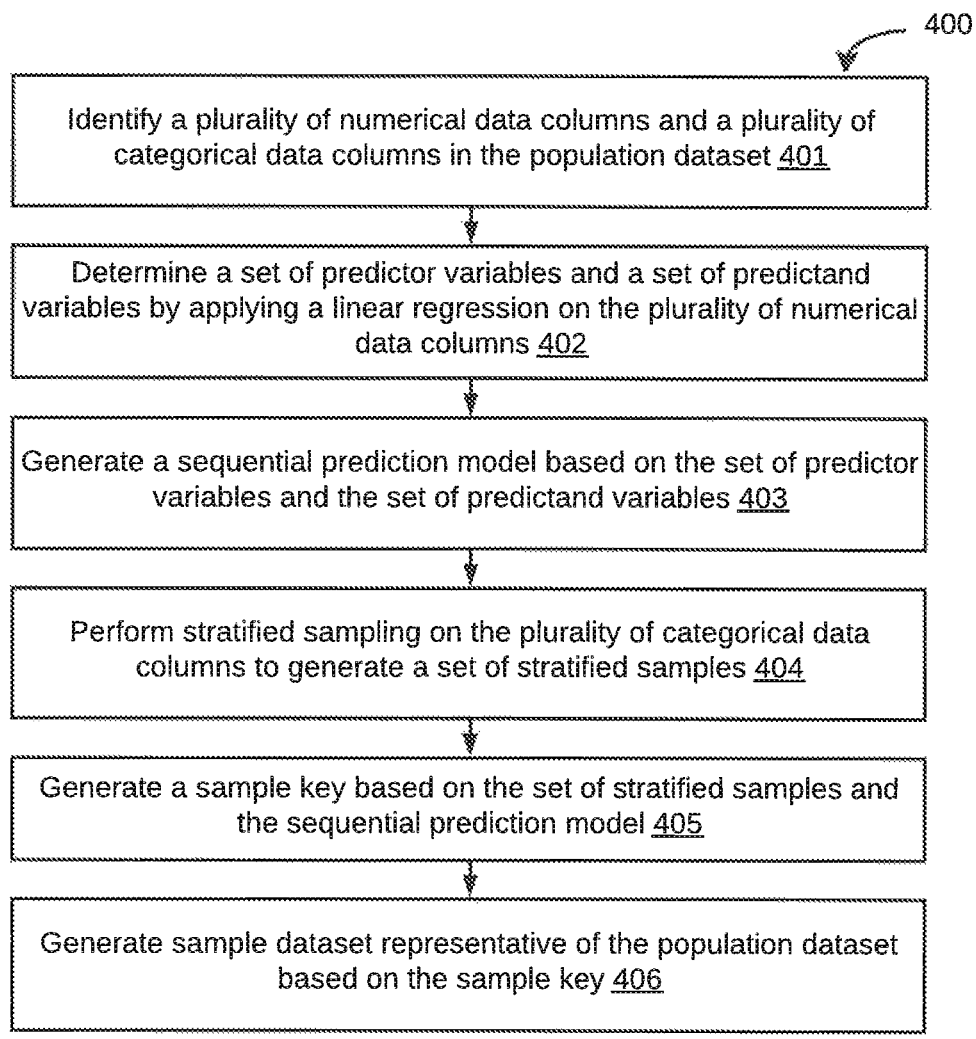
FIG. 4 is a flow diagram of an exemplary process for sampling population dataset using an ANN model, in accordance with some embodiments of the present disclosure.

Referring now to FIG. 4, exemplary control logic 400 for sampling population dataset using an artificial neural network (ANN) model via a system, such as the system 100, is depicted via a flowchart, in accordance with some embodiments of the present disclosure. As illustrated in the flowchart, the control logic 400 may include the steps of identifying a plurality of numerical data columns and a plurality of categorical data columns in the population dataset at step 401; determining a set of predictor variables and a set of predictand variables by applying a linear regression on the plurality of numerical data columns at step 402; generating a sequential prediction model based on the set of predictor variables and the set of predictand variables at step 403; performing stratified sampling on the plurality of categorical data columns to generate a set of stratified samples at step 404; generating a sample key based on the set of stratified samples and the sequential prediction model at step 405; and generating a sample dataset representative of the population dataset based on the sample key at step 406.

In some embodiments, determining the set of predictor variables at step 402 may include the steps of performing correlation between each of at least two predictor columns and removing at least one predictor column from each of the at least two predictor columns when the correlation is above a predetermined threshold. Further, in some embodiments, performing stratified sampling at step 404 may include the steps of generating a sample size for the population dataset and filtering the plurality of categorical data columns based on the sample size. Additionally, generating a sample size for the population dataset may include the step of generating the sample size based on a population size at a predetermined margin of error or at a predetermined confidence level.

Further, in some embodiments, generating a sample key at step 405 may include the step of generating the sample key further comprises selecting a set of sample indices by iteratively evaluating each sample from the set of stratified samples, Additionally, evaluating each sample may include the steps of determining a mean absolute error by comparing actual predictand variables with predicted predictand variables generated by the sequential prediction model and selecting a sample with the mean absolute error being the least.

Figure 5A:
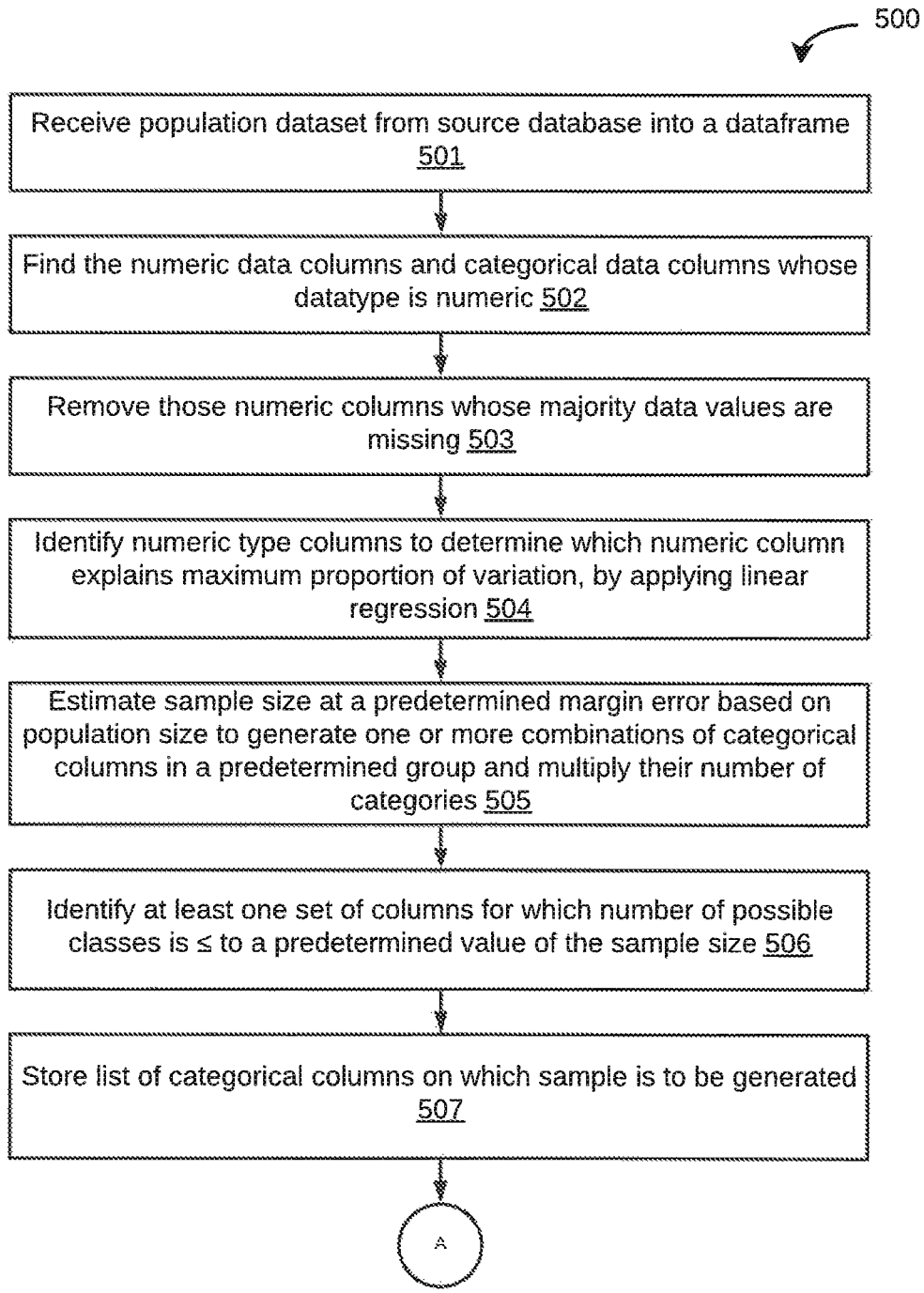
FIGS. 5A and 5B are flow diagrams of a detailed exemplary process for sampling population dataset using an ANN model, in accordance with some embodiments of the present disclosure.
Figure 5B:
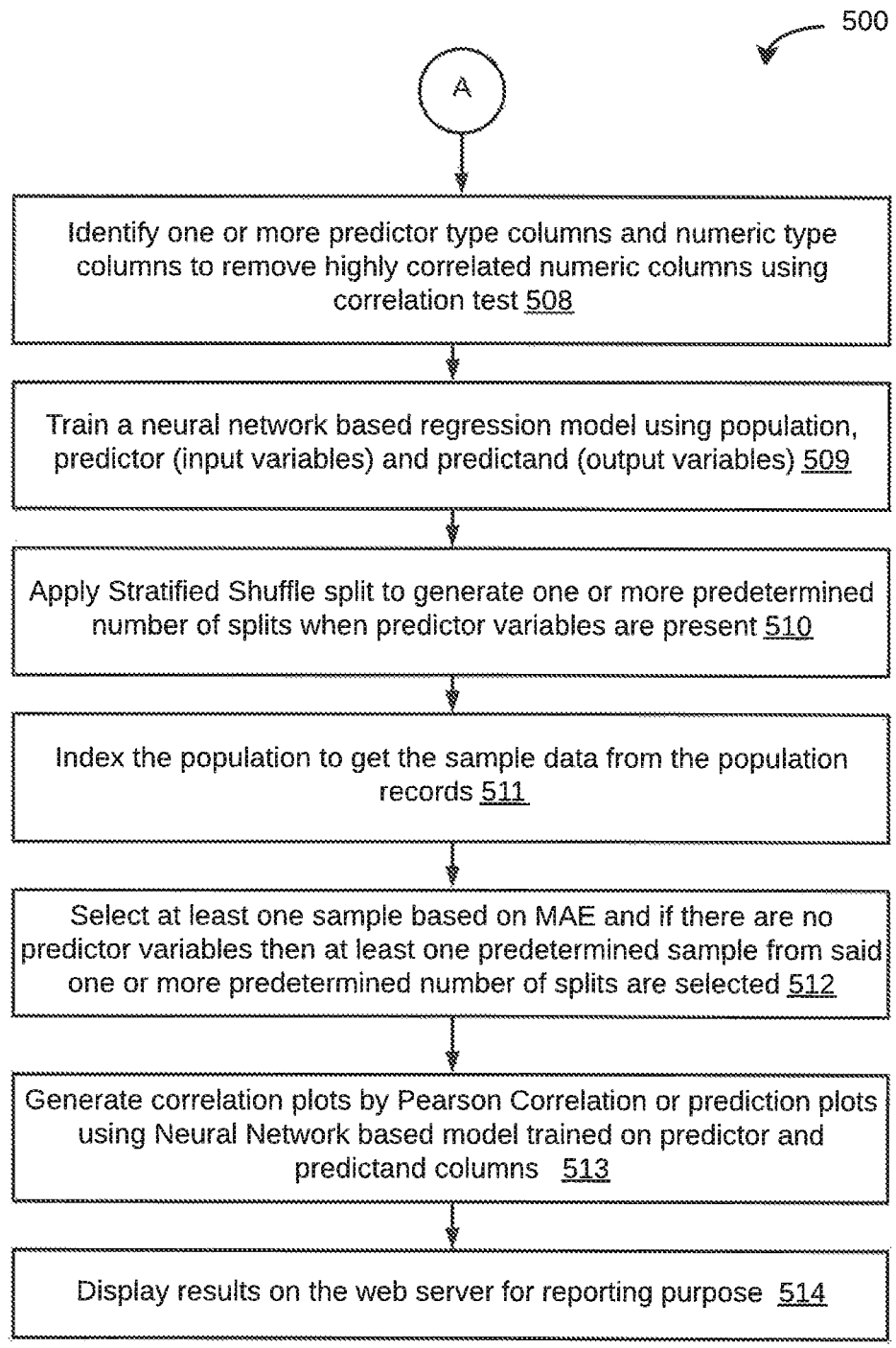

Referring now to FIGS. 5A and 5B, exemplary control logic 500 for sampling population dataset using an artificial neural network (ANN) model is depicted in greater detail via a flowchart, in accordance with some embodiments of the present disclosure. At step 501, the control logic 500 may receive a population dataset from source database. Further, the control logic 500 may store the population dataset to generate a sample dataset. Here, a user intervention may be required to initiate the sampling process. Further, the user may upload the population dataset which may be stored in the primary memory as a pandas data frame for processing purpose. It should be noted that the population dataset may have premise data store, cloud based storage facility, distributed file system, but the simplest way to upload the population dataset may be in a flat file format.

Further, at step 502, the control logic 500 may identify a plurality of numerical data columns and a plurality of categorical data columns in the population dataset. The control logic 500 may distinguish the plurality of numerical data columns and the plurality of categorical data columns based on data domains and distinctness of the population dataset. The control logic 500 may identify the plurality of numerical data columns using to_numeric( ) utility of the pandas data frame. Moreover, the plurality of categorical data columns may be identified based on comparison of n unique( ) utility of the pandas data frame with respect to 20% of a population size. While comparing, when a distinct count may be less than 20% of population size, then that column may be considered as the plurality of categorical data columns otherwise continuous in nature.

Further, at step 503, the control logic 500 may remove the plurality of numeric data columns in which majority data values may be missing. When missing percentage of a numeric values in a given column of the plurality of numeric data columns may be beyond 80%, then the given column may be ignored for further processing because the given column may not qualify as the set of predictor variables or the set of predictand variables to train a sequential prediction model. It should be noted that missing % of the numeric value in the given column may be estimated using the isna( ) utility of pandas data frame and the given column may be removed by drop( ) utility of pandas data frame.

Further, at step 504, the control logic 500 may identify the plurality of numeric data columns which may explain maximum proportion of variation by applying a linear regression on the plurality of numeric data columns. In an embodiment, when the plurality of numerical data columns in the population dataset may be absent after removing the plurality of numeric data columns then, for performing stratified sampling, a dummy column may be created by a program code. It should be noted that the dummy column may include rows exactly equal to the number of rows in the population dataset, and may be filled with a dummy value (for example—123456789).

However, when the plurality of numerical data columns may be present in the population dataset then the dummy column may not be required to create. The control logic 500 may identify the set of predictor variables and the set of predictand variables using the plurality of numeric data columns. Further, the control logic 500 may determine a R-square value at a time, for each possible combination of a pair of the plurality of numerical data columns, using stats.linregress( ) utility of stats package. It should be noted that the R-square value may be a statistical measure which may also be known as coefficient of determination. The R-square value may signify the percentage variation of the set of predictand variables when explained by the set of predictor variables. The control logic may determine the R-square value as:

$$R\text{-square value} = \text{Explained variation}/\text{Total variation}$$

The R-square value may have ranges from 0% to 100%. When the control logic 500 may determine the R-square value close to 100%, then the set of predictor variable may explain major proportion of variation in the set of predictand variable. Hence, when the R-squared value may be higher, better sampling of the population dataset may be achieved.

Figure 6:
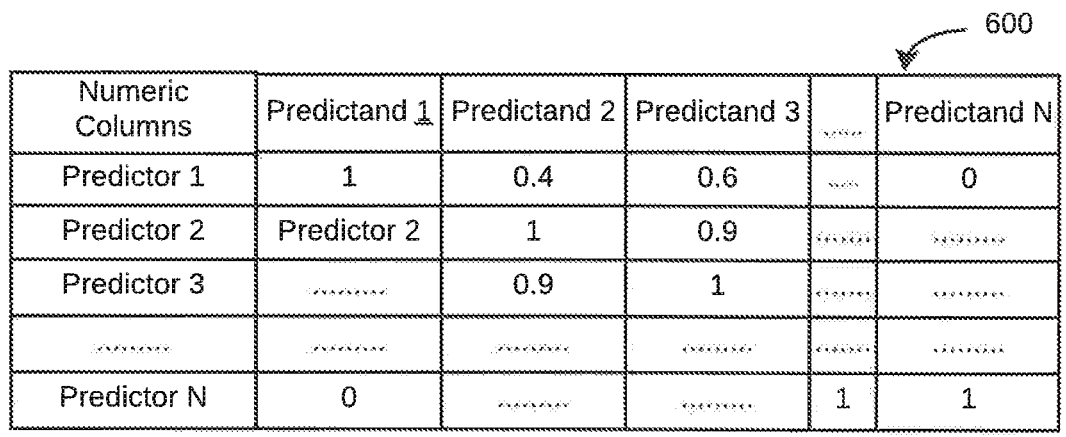
FIG. 6 is a sample matrix to generate a set of predictor variables and a set of predictand variables, in accordance with some embodiments of the present disclosure.

Referring now to FIG. 6, a sample matrix 600 to generate a set of predictor variables and a set of predictand variables is illustrated, in accordance with some embodiments of the present disclosure. the control logic 500 may create the sample matrix with the set of predictor variables and the set of predictand variables to determine a list of the set of predictor variables and a list of the set of predictand variables based on the R-square value. Further, the control logic 500 may store the list of the set of predictor variables and the list of the set of predictand variables for further processing.

Referring back to FIG. 5, at step 505, the control logic 500 may determine a sample size at 5% of the margin of error based on the population size to generate a set of stratified samples. Moreover, to determine the sample size, the control logic 500 may use the population size at 5% of the margin of error. Further, when the plurality of numerical data columns may not be available to operate then, the control logic 500 may generates a pair of each possible combination of the plurality of categorical data columns.

Further, at step 506, the control logic 500 may identify at least one pair of the plurality of categorical data columns for which number of categories in the set of stratified samples may be less than half of the value of the sample size, The control logic 500 may check each possible pair of the plurality of categorical data columns to prepare a list of the plurality of categorical data columns in which the set of stratified sample may be less than half of the sample size at 5% of the margin of error. When the control logic may generate the set of stratified samples at 5% of the margin of error then, it may ensure that the data rows may be selected in exact proportion in which the set of stratified samples of the plurality of categorical data columns may be distributed throughout the population dataset.

Further, at step 507, the control logic 500 may store the list of the plurality of categorical data columns on which the set of stratified samples may be generated. the list of the plurality of categorical data columns may be used further to generate a list of sample row indexes.

Further, at step 508, the control logic 500 may remove the plurality of numerical data columns which may be highly correlated with the remaining of the plurality of numerical data columns in the population dataset. The control logic 500 may identify correlated numeric columns in the plurality of numerical data columns using a correlation test. Moreover, the control logic 500 may check whether the plurality of numerical data columns still present or only the plurality of categorical data columns exist for generating the set of stratified sample. This may be achieved by using the len( ) utility of python. It should be noted that a Pearson correlation test may be used on the set of predictor variables to identify the correlation in the population dataset. When high level of correlation exists between any two predictor columns (of the plurality of numeric data columns), then one of the predictor column may be dropped because two highly correlated columns may behave exactly the same while training the neural network model for predicting the predictand variables.

Further, at step 509, the control logic 500 may train the neural network model to identify the set of predictand variable by applying linear regression on the plurality of numerical data columns. After removing the highly correlated columns, the control logic 500 may train the neural network in which the population data may be used as a training data. Moreover, to train the neural network, the control logic 500 may remove a row in the population data, which may contain a missing value because the control logic 500 may not ask the user to provide a labeled cleansed training set to generate the set of stratified sample.

Additionally, the row on which the neural network model may be trained may not be same with respect to the row in the set of stratified sample on which the neural network model may be tested. This is because some rows may include missing values in the set of predictand variable may be dropped while training the neural network model even when there may not be missing values in the set of predictor variable. When the set of stratified sample may be created to predict missing values in the set of predictand variables using the trained neural network then the control logic 500 may evaluate the performance by estimating the mean absolute error for each of the set of stratified samples.

The control logic 500 may use the Sequential( ) utility of keras to build the neural network model with two hidden layers of 200 nodes each, with 'elu' as its activation function. Additionally, the neural network model may include an input layer and an output layer with 100 nodes each. Further, the neural network model (which may be a sequential prediction model) may be compiled with a plurality of parameters which may include optimizer ('rmsprop'), loss ('mse'), and metrics ('mae'). It should be noted that the neural network model may be created once and may be used to evaluate each of the set of stratified sample to choose the optimum one.

Further, at step 510, the control logic 500 may apply stratified shuffle split to generate one or more predetermined number of splits when predictor variables may be present. The control logic 500 may use filtered list of the plurality of categorical data column and the population dataset to create the set of stratified samples using the StratifiedShuffleSplit( ) utility of sklearn package in python. A plurality of parameters (which may include number of splits and the test size) may be used to create the set of stratified samples. The number of splits may be 1, when the set of predictor variables and the set of predictand variables may not be identified. However, the number of splits may be 50 when some of the set of predictor variables and the set of predictand variables may be identified. The test size may be a ratio of the sample size to the population size at 5% of the margin of error.

The margin of error and confidence levels may be adjusted until the set of stratified samples may be generated based on the condition that the number of the set of stratified samples may be less than half of the value of the sample size. Moreover, to ensure that the set of stratified samples may be created by the StratifiedShuffleSplit( ) method may be indeed representative of the population dataset, one-way chi square test may run on the population dataset.

Further, at step 511, the control logic 500 may index the population dataset to get the sample dataset from the population records. The control logic 500 may use the list of row indexes to extract the sample dataset from the population dataset. The control logic 500 may use the iloc( ) utility of Pandas DataFrame in python to index the population dataset. Further, the control logic 500 may store statistically relevant sample of the sample dataset for further processing.

Further, at step 512, the control logic 500 may select at least one sample dataset based on the mean absolute error or at least one or more predetermined sample dataset from the set of stratified samples when the set of predictor variables may be absent. The control logic 500 may use the model.evaluate( )utility of the sequential prediction model to predict the set of predictand variables using the sample dataset as the test dataset. Further, after evaluating the 50 samples on the sequential prediction model, a sample key (which may be a sample number) and their values (value may be the mean absolute error) may be stored in a dictionary.

Further, the dictionary may be iterated to generate the sample key whose value may be minimum using a comparison operator of the python language. Further, the sample dataset with the least mean absolute error may be selected and the sample key of the sample dataset may be used to get the list of indexes of that sample from the 50 sample indexes.

Further, at step 513, the control logic 500 may generate correlation plots by Pearson correlation or prediction plots using the sequential prediction model trained based on the set of predictor variables and the set of predictand variables. The control logic 500 may estimate a plurality of details of the sample dataset. The plurality of details may include, but may not be limited to, mean absolute error (when the plurality of numerical data columns and the plurality of categorical data columns may exist in the population dataset); mean absolute error plot (the plot with mean-absolute error on y-axis and sample key on x-axis); records in population (number of records in the population dataset calculated by the len( ) utility of python language); records of samples (number of records in the sample dataset calculated by the len( ) utility of python language); percentage records in the sample dataset (calculated as (records in sample/records in population)*100); size of population in bytes (estimated using the getsize( ) utility of OS package in python language); size of sample in bytes (estimated by multiplying the population size in bytes by the percentage records in the sample dataset); number of categorical columns and number of numeric columns; average record size (estimated based on ratio of size of population dataset in bytes to number of rows in population dataset); and a correlation plot (obtained using the Pearson method of correlation in the corr( ) utility of python language and matplotlib package.

Further, at step 514, the control logic 500 may display results on the web server for reporting purpose. The webserver may send get request to the sample database server to fetch the sample dataset and the corresponding jsonified results about the sample to be rendered on the html page for the viewers to access. When the user may need to download the sample dataset for reporting purposes, the user may do that or the user may generate a fresh sample by sending a request back to the sample database server.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
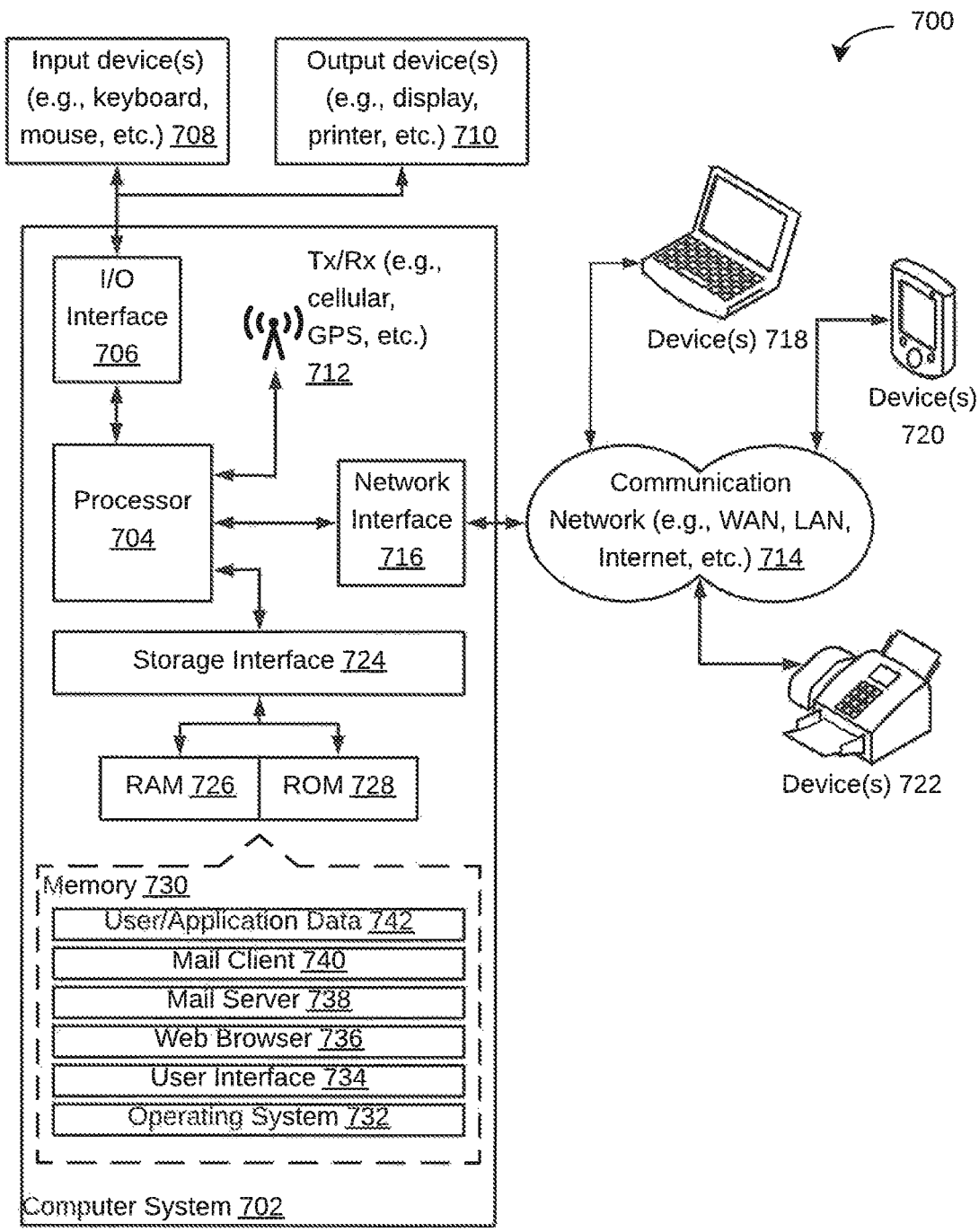
FIG. 7 is a block diagram of an exemplary computer system for implementing embodiments consistent with the present disclosure.

Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user or system-generated requests. A user may include a person, a person using a device such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices 718, 720 and 722 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices 718, 720, and 722.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces 734 may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers 736 may utilize facilities such as AJAX, DHTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provides method and system for sampling population dataset using an artificial neural network (ANN) model. The method may use several testing sets on the same prediction algorithm, thereby eliminating the need to reduce the input variables. Moreover, the method may provide the improved predictive data sampling model comprising the stratified sampling in which different types of variables are pre-identified in the pre-processing phase and their contribution in generating the sample with the help of several statistical tests like—one-way chi square test, correlation test and regression obviates the need for rejecting any input variables during the prediction phase.

Further, the method may provide the predictive sampling model in which the stratified sampling takes place even when multiple data samples are not available in a labeled manner. It may be advantageous to provide the improved predictive data sampling model for the random sampling in which selecting every nth subsequent element from the start creates a sample in which sampling bias can be completely avoided.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

For example, the conventional sampling techniques for identifying and selecting highly correlated attributes for creating a sample do not take into account the non-correlated attributes which is a part of the population. Additionally, conventional techniques lack any mechanism in which correlation may be applied to all forms of attribute values of an object so as to include several categories of attributes while creating a sample. Further, conventional sampling techniques fail to provide systematic random sampling in which by selecting every nth subsequent element from the start creates a sample without sampling bias. Further, conventional sampling techniques lack in any mechanism which takes into account an equitable distribution of all types of units while creating a sample from the population when the population is distributed such that there is a high proportion of a certain characteristic of unit present compared to others, thereby giving rise to sampling bias problem. Further, conventional sampling technique does not describe the sampling model in which all types of input variables present in the population forms a part of training and testing phase, Further, conventional sampling techniques lack any mechanism in which sampling takes place even when multiple data samples are not available in a labeled manner. Moreover, conventional sampling techniques including the random sampling techniques lack any mechanism to resolve the problem of sampling bias in the given population.

In contrast, the improved sampling techniques, described in various embodiments discussed above, may be applied on multiple categories of the population dataset. In particular, the improved sampling techniques described above provide for improved stratified sampling in which the concept of neural network based regression model is used to select the appropriate numeric units from the population to guarantee the selection of a representative sample from the population. Further, the improved predictive data sampling model is configured to resolve the problem of sampling bias in the given population and provide a completely representative sample for one or more units selected randomly on multiple categories of a population data set. The improved predictive sampling model may provide a shuffled stratified sampling that takes into account the proportions of each type of unit present in the population. In particular, the shuffled stratified sampling takes into account the different varieties of units present in the population by determining categorical and numeric columns separately.

In the improved sampling techniques described above, different categories of attributes are first identified by the preprocessing stage to effectively account for categorical and numeric type attributes while creating a sample from the population data set. It should be noted that a labeled set is not required to generate a sample from the population. In other words, the object of the techniques described above is to provide the improved predictive sampling model comprising the stratified sampling. The stratified sampling is configured to use several testing sets on the same prediction algorithm, thereby eliminating the need to reduce the input variables. Also, the categorical variables are treated differently while carrying out sampling. The categorical variables are not used as input variables for predictive algorithms, but are used in stratified sampling approach. Further, different types of variables along with their contribution in generating the sample are pre-identified in the pre-processing phase by a preprocessor module with the help of several statistical tests, including but not limited to, one-way chi square test, correlation test, and regression test.

The specification has described method and a system for data sampling using an ANN model, The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description, Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein, Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for sampling population dataset using an artificial neural network (ANN) model, the method comprising:
    identifying, by a data sampling device, a plurality of numerical data columns and a plurality of categorical data columns in the population dataset;
    determining, by the data sampling device, a set of predictor variables and a set of predictand variables by applying a linear regression on the plurality of numerical data columns;
    generating, by the data sampling device, a sequential prediction model based on the set of predictor variables and the set of predictand variables;
    performing stratified sampling, by the data sampling device, on the plurality of categorical data columns to generate a set of stratified samples;
    generating, by the data sampling device, a sample key based on the set of stratified samples and the sequential prediction model; and
    generating, by the data sampling device, a sample dataset representative of the population dataset based on the sample key.

2. The method of claim 1, wherein determining the set of predictor variables comprise:
    performing correlation between each of at least two predictor columns;
    removing at least one predictor column from each of the at least two predictor columns when the correlation is above a predetermined threshold.

3. The method of claim 1, wherein performing stratified sampling further comprises generating a sample size for the population dataset.

4. The method of claim 3, wherein generating the sample size comprises generating the sample size based on a population size at a predetermined margin of error or at a predetermined confidence level.

5. The method of claim 3, wherein performing stratified sampling further comprises filtering the plurality of categorical data columns based on the sample size.

6. The method of claim 1, wherein generating the sample key further comprises selecting a set of sample indices by iteratively evaluating each sample from the set of stratified samples.

7. The method of claim 6, wherein evaluating each sample from the set of stratified samples comprises:
    determining a mean absolute error by comparing actual predictand variables with predicted predictand variables generated by the sequential prediction model; and
    selecting a sample with the mean absolute error being the least.

8. A system for sampling population dataset using an artificial neural network (ANN) model, the system comprising:
    a data sampling device comprising at least one processor and a computer-readable medium storing instructions that, when executed by the at least one processor, cause the at least one processor to perform operations comprising:
        identifying a plurality of numerical data columns and a plurality of categorical data columns in the population dataset;
        determining a set of predictor variables and a set of predictand variables by applying a linear regression on the plurality of numerical data columns;
        generating a sequential prediction model based on the set of predictor variables and the set of predictand variables;
        performing stratified sampling on the plurality of categorical data columns to generate a set of stratified samples;
        generating a sample key based on the set of stratified samples and the sequential prediction model; and
        generating a sample dataset representative of the population dataset based on the sample key.

9. The system of claim 8, wherein determining the set of predictor variables comprise:
    performing correlation between each of at least two predictor columns;
    removing at least one predictor column from each of the at least two predictor columns when the correlation is above a predetermined threshold.

10. The system of claim 8, wherein performing stratified sampling further comprises generating a sample size for the population dataset.

11. The system of claim 10, wherein generating the sample size comprises generating the sample size based on a population size at a predetermined margin of error or at a predetermined confidence level.

12. The system of claim 10, wherein performing stratified sampling further comprises filtering the plurality of categorical data columns based on the sample size.

13. The system of claim 8, wherein generating the sample key further comprises selecting a set of sample indices by iteratively evaluating each sample from the set of stratified samples.

14. The system of claim 13, wherein evaluating each sample from the set of stratified samples comprises:
    determining a mean absolute error by comparing actual predictand variables with predicted predictand variables generated by the sequential prediction model; and
    selecting a sample with the mean absolute error being the least.

15. A non-transitory computer-readable medium having stored thereon, a set of computer-executable instructions causing a computer comprising one or more processors to perform steps comprising:
    identifying a plurality of numerical data columns and a plurality of categorical data columns in the population dataset;
    determining a set of predictor variables and a set of predictand variables by applying a linear regression on the plurality of numerical data columns;
    generating a sequential prediction model based on the set of predictor variables and the set of predictand variables;
    performing stratified sampling on the plurality of categorical data columns to generate a set of stratified samples;
    generating a sample key based on the set of stratified samples and the sequential prediction model; and
    generating a sample dataset representative of the population dataset based on the sample key.

16. The non-transitory computer-readable medium of claim 15, wherein determining the set of predictor variables comprise:
    performing correlation between each of at least two predictor columns;
    removing at least one predictor column from each of the at least two predictor columns when the correlation is above a predetermined threshold.

17. The non-transitory computer-readable medium of claim 15, wherein performing stratified sampling further comprises generating a sample size for the population dataset based on a population size at a predetermined margin of error or at a predetermined confidence level.

18. The non-transitory computer-readable medium of claim 17, wherein performing stratified sampling further comprises filtering the plurality of categorical data columns based on the sample size.

19. The non-transitory computer-readable medium of claim 15, wherein generating the sample key further comprises selecting a set of sample indices by iteratively evaluating each sample from the set of stratified samples.

20. The non-transitory computer-readable medium of claim 19, wherein evaluating each sample from the set of stratified samples comprises:
    determining a mean absolute error by comparing actual predictand variables with predicted predictand variables generated by the sequential prediction model; and
    selecting a sample with the mean absolute error being the least.

* * * * *